United States Patent Office 3,583,917
Patented June 8, 1971

1 2

3,583,917 TELLURIUM-LEAD MODIFIED CHROMIUM DIOXIDE

Toshihiro Mihara, Yukio Terada, and Eiichi Hirota, Osaka, Japan, assignors to Matsushita Electric Industrial Co., Ltd., Osaka, Japan No Drawing. Filed Oct. 22, 1968, Ser. No. 769,734
Claims priority, application Japan, Feb. 23, 1968, 43/11,887; Feb. 28, 1968, 43/13,220
Int. Cl. C01g 37/02
U.S. Cl. 252—62.51 8 Claims

ABSTRACT OF THE DISCLOSURE

Ferromagnetic chromium dioxide is prepared by mixing chromium trioxide, lead (or lead compound) and tellurium (or tellurium compound), heating the mixture at 280–480° C. in an autoclave, furnace-cooling the mixture, washing and drying. The amount of lead is 0.01 to 10 atomic percent, and the amount of tellurium is 0.01 to 20 atomic percent. The heating of the mixture is advantageously effected in the presence therein of $NH_4^+$ ions in a weight ratio to $CrO_3$ of 0.001:1 to 0.15:1. The obtained ferromagnetic chromium dioxide has high magnetic coercive force and high saturation magnetization so that it is useful e.g. in magnetic recording tape, etc.

This invention relates to a ferromagnetic material and more particularly to a ferromagnetic chromium dioxide incorporated with a combination of lead and tellurium, and to a method for making the same.

Since the Russian publication by S. M. Ariya et al. (Zhur. Obshei. Khim. Soviet 23, page 1241, 1953) has disclosed that ferromagnetic chromium dioxide in a single phase of rutile-type structure can be obtained by the thermal decomposition of anhydrous chromium trioxide at a temperature of 420° C. to 450° C. under an oxygen pressure of 200 to 300 atmospheres, much attention has been paid to ferromagnetic chromium dioxide in a single phase for use in magnetic recording members. Various modified chromium dioxides have been described in the prior literature; see, for example, U.S. Pat. Nos. 2,885,365; 2,923,683; 2,923,684; 2,923,685 and 3,243,260. Recent magnetic recording tape requires ferromagnetic materials having a high magnetic coercive force, a high saturation magnetization and a uniform particle size distribution for achieving a high resolution recording. From the standpoint of manufacture, it is desirable to make the objective ferromagnetic oxide by using a heating temperature as well as a reaction pressure as low as possible.

An object of the present invention is to provide ferromagnetic chromium oxide having a high magnetic coercive force and a high saturation magnetization.

A further object of the invention is to provide a method for making the objective ferromagnetic chromium oxide having a high coercive force and a high saturation magnetization by using a low heating temperature and forming pressure.

These and other objects of the invention will be apparent up consideration of the following detailed description taken together with the claims.

The ferromagnetic chromium dioxide in a powder form according to the invention has a combination of lead and tellurium incorporated therewith.

It has been discovered according to the present invention that ferromagnetic chromium dioxide having a combination of lead and tellurium incorporated therewith has a higher magnetic coercive force than the chromium dioxide with a single addition of lead or tellurium.

A high amount of said combination impairs the resultant chromium dioxide in the magnetic properties, especially in the magnetization. Chromium dioxide having a high coercive force and a high maximum magnetization is obtained by addition of said combination in an amount of not more than 30 atomic percent in total. Said combination in an amount of not more than 30 atomic percent comprises 0.01 to 10 atomic percent of lead and 0.01 to 20 atomic percent of tellurium in accordance with the invention. The ferromagnetic chromium dioxides in such compositions have 200 to 600 oersteds of intrinsic coercive force, 1,500 to 2,500 gauss of residual magnetization and at least 3,000 gauss of maximum magnetization at room temperature.

The atomic percent referred to herein is based on a sum of the three kinds of atoms, i.e. chromium, lead and tellurium and therefore, should be 100 atomic percent when all atomic percent of chromium, lead and tellurium are summed up.

The coercive force ($H_c$), residual magnetization ($B_r$) and maximum magnetization ($4\pi I_m$) are derived from I-H hysteresis loop of the ferromagnetic material measured at maximum field of 2000 oersteds and room temperature.

Preferable amount of said combination is not more than 11 atomic percent in total and comprises 0.01 to 1 atomic percent of lead and 0.01 to 10 atomic percent of tellurium. Such compositions result in the intrinsic coercive force up to 500 oersteds, the residual magnetization of at least 2000 gauss, and the maximum magnetization of at least 3,500 gauss at room temperature.

Optimum amount of said combination is not more than 3.5 atomic percent in total and comprises 0.01 to 0.5 atomic percent of lead and 0.01 to 3 atomic percent of tellurium. Chromium dioxide in such composition has a combination of high coercive force up to 500 oersteds, high residual magnetization of at least 2000 gauss, and high maximum magnetization of at least 4,000 gauss and is characterized by uniform distribution of particle size. The particles are in an acicular form of 0.1 to 2.0 microns in length and 0.01 to 0.4 micron in width. The ratio of the length to the width ranges from 4:1 to 30:1. The particle size is determined by measuring particle sizes in electron microscope photographs of 100 powders random sampled.

The chromium dioxide in the aforesaid optimum composition exists in a single phase of rutile type tetragonal crystal structure when examined by a D3–F type X-ray diffractometer (Rigakudenki Co.), using copper Kα radiation at 35 kv. and 15 ma. Chromium dioxide in a composition other than said optimum composition has a large amount of said tetragonal crystal structure and a small amount of other crystal structures.

It is more desirable for achieving a higher coercive force and a higher maximum magnetization that the aforesaid combination in operable compostion, in advantageous composition or in optimum composition has an atomic ratio of tellurium to lead ranging from 10:1.0 to 2.0:1.0.

Chromium dioxide having an aforesaid combination of lead and tellurium incorporated therewith can be prepared by mixing intimately chromium trioxide, metallic lead or any available and suitable lead compound and metallic tellurium or any available and suitable tellurium compound so as to have a desired atomic percent of chromium, lead and tellurium and heating the mixture at a temperature of 280° C. to 480° C. in an autoclave producing a high pressure as set forth hereinafter. Advantageous tellurium compound is $TeO_2$, $TeO_3$, $TeCl_4$, $H_2TeO_4$, $H_6TeO_6$, $Na_2TeO_4$, $K_2TeO_4$. Among these compounds, those are more desirable where the tellurium is in hexavalent state, e.g. $H_2TeO_4$, $H_6TeO_6$ or $TeO_3$. Operable lead compound is $PbO$, $Pb_2O_3$, $PbO_2$, $Pb_3O_4$, $PbSO_4$, $PbS$, $Pb(NO_3)_2$, $PbCrO_4$, $PbCl_2$, $PbCO_3$, $PbF_2$, $PbI_2$, $Pb(VO_3)_2$, $PbWO_4$, $PbC_2O_4$, $Pb_3(PO_4)_2$, $Pb(HCOO)_2$, $PbSnO_3$. In connection with the lead compound, the best result can be obtained with $Pb_2O_3$ or $PbO_2$.

Said mixture can be made by employing any suitable mixing technique in a wet or dry method. In a wet method it is preferable that the mixture of lead and tellurium is added with a small amount of nitric acid or aqua regia with bromine water for oxidizing the incorporated lead compound and tellurium compound prior to mixing with chromium trioxide. The resultant mixture is dried.

The mixture with or without a small amount of water is placed in an autoclave which is made of a corrosion-resistant metal such as stainless steel and which is provided with a thermocouple for measuring the reaction temperature and with a pressure gauge. Care should be taken that the amount of mixture placed in the autoclave is controlled with respect to the inner volume of the autoclave so that a pressure in the autoclave due to the oxygen liberated from chromium trioxide, $NH_3$ gas, nitrogen and water vapour is in a range of 50 to 1,000 atmospheres at the desired reaction temperature.

The autoclave having the mixture therein can be heated by any suitable method such as by an electric heater while the temperature of the mixture is being measured. After reaching the reaction temperature, the mixture is maintained at the temperature for a suitable time period which depends on the pressure and the reaction temperature and is then cooled to room temperature (about 15° to about 30° C.) in the autoclave. After having cooled, the mixture is removed from the autoclave, washed with water and dried by any suitable method.

It has been discovered according to the invention that the chromium dioxide having the combination of lead and tellurium incorporated therewith can be improved remarkably in the magnetic coercive force when the starting mixture has added thereto an aqueous solution containing $NH_4^{+1}$ ions or a compound including $NH_4^{+1}$ ions (hereinafter referred to as $NH_4^+$ ions) and is heated in a man-containing $NH_4^+$ ions or compound including $NH_4^+$ ions is operable; for example, aqueous solutions of $NH_3$, $NH_4Cl$, $NH_4F$, $NH_4Br$, $(NH_4)_2SO_4$, $NH_4NO_3$, $HCOONH_4$, $(NH_4)_2C_2O_4$, $NH_4I$ and $CH_3COONH_4$ are suitable. Said aqueous solution varies in the concentration of $NH_4^+$ ions with the amount thereof. The amount added to the starting mixture depends on the concentration of said aqueous solution and is in a weight ratio of chromium trioxide in the starting mixture to $NH_4^+$ ions ranging from 1.0:0.001 to 1.0:0.15. The higher concentration requires the smaller amount of added aqueous solution. Said starting chromium trioxide can be admixed with at least one compound containing $NH_4^+$ ions in an amount to produce a said weight ratio of $NH_4^+$ ions to chromium trioxide.

The novel effect of additive $NH_4^+$ ions will be readily understood by a comparison between two chromium dioxides which are prepared from a mixture with and without $NH_4^+$ ions in a manner exactly similar to each other. A mixture consisting of 20 grams of chromium trioxide, 0.162 gram of telluric acid and 0.136 gram of lead monoxide and 2 milliliters of water is prepared. One part of the mixture is admixed with 4 milliliters of ammonia water (28% by weight of $NH_3$) and then heated in a manner exactly similar to that above. The resultant two chromium dioxides have the following properties.

The properties of the chromium dioxide without $NH_4^+$ are:

Crystal structure: a rutile type structure
Average grain size:
 1.0–2.0$\mu$ in length
 0.1–0.4$\mu$ in width
Coercive force: 240 oersteds
Maximum magnetization: 4200 gauss
Residual magnetization: 2000 gauss The properties of the chromium dioxide with $NH_4^+$ are:

Crystal structure: a rutile type structure
Average grain size:
 0.2–0.5$\mu$ in length
 0.05–0.1$\mu$ in width
Coercive force: 450 oersteds
Maximum magnetization: 4200 gauss
Residual magnetization: 2120 gauss Presently preferred exemplary embodiments follow.

EXAMPLE 1

One hundred and fifty grams of chromium trioxide, 1.22 grams of telluric acid and 1.70 grams of lead monoxide are mixed in a mortar. The mixture of starting material is placed into an autoclave of stainless steel.

The inner volume of the autoclave is 200 milliliters. Thirty milliliters of water is added to the mixture in the autoclave. The autoclave is closed and set into an electric furnace of 30 cm. diameter. The autoclave is also connected, through a high pressure tube of stainless steel, to a high pressure controlling system comprising a pressure gauge, a pressure head for automatic recording apparatus and a leak bulb.

The oxygen is introduced into the autoclave up to 20 kg./cm.$^2$ of pressure at room temperature.

The autoclave in heated at a rate of 100° C. per hour and maintained at 390° C. for 2 hours. The inner pressure of the autoclave at 390° C. is 375 kg./cm$^2$. After heating, the autoclave is slowly cooled to room temperature. The pressure is then released. The reaction product is removed from the autoclave and rinsed with distilled water. The product is black powder and magnetic.

The properties of the product are:

Crystal structure: a rutile type structure
Average grain size:
 1.0–2.0$\mu$ in length
 0.1–0.4$\mu$ in width
Coercive force: 240 oersteds
Maximum magnetization: 4800 gauss
Residual magnetization: 2200 gauss

EXAMPLE 2

One hundred grams of chromium trioxide, 0.813 gram of telluric acid and 0.680 gram of lead monoxide are mixed and placed into an autoclave the same as that of Example 1.

Ten milliliters of water is added to the mixture so that the mixture is in a flowable state. Twenty milliliters of ammonia water (28% solution) is added dropwise to the flowable mixture. The resultant mixture in the autocalve is heated at 390° C. for 2 hours under a pressure of 420 kg./cm.$^2$ and is cooled at room temperature in 16 hours.

The reaction product is removed and rinsed with distilled water. The product is dried at a temperature below 200° C. The product is black powder and magnetic.

The properties of the product are:

Crystal structure: a rutile type structure
Average grain size:
 0.3–0.6$\mu$ in length
 0.05–0.1$\mu$ in width
Coercive force: 420 oersteds
Maximum magnetization: 4350 gauss
Residual magnetization: 1970 gauss

EXAMPLE 3

Fifteen grams of chromium trioxide, 0.229 gram of telluric acid, 0.045 gram of lead monoxide and 2 grams of ammonium chromate are mixed together and placed into an autoclave, which has an inner diameter of 3 cm. and an inner depth of 5.5 cm. 5 milliliters of water is added to this mixture. The mixture is heated to 400° C. for 2 hours.

The properties of the product are:

Crystal structure: a rutile type structure
Average grain size:
0.2–0.5μ in length
0.01–0.1μ in width
Coercive force: 460 oersteds
Maximum magnetization: 4050 gauss
Residual magnetization: 2200 gauss

EXAMPLE 4

Various mixtures consisting of 20 grams of chromium trioxide, 0.163 gram of the telluric acid and various amounts of lead monoxide are prepared. These mixtures are placed into the autoclave and then are admixed with 2 milliliters of water and 4 milliliters of ammonia water (28% solution).

The inner volume of the autoclave is 40 milliliters. The heating temperatures are 380° C.–410° C. and the heating times are 1–2 hours.

The heating temperatures are controlled ±2° C.

These treatments clarify the effect of the amount of lead monoxide in the starting material on the properties of the reaction product.

Table 1 shows the relation of the amount of lead monoxide and magnetic properties of the product.

TABLE 1.—MAGNETIC PROPERTIES OF FERROMAGNETIC CHROMIUM OXIDE INCLUDING VARIOUS AMOUNTS OF LEAD

| | PbO (atomic percent of Pb relative to Cr) | Hc(oersteds) | Gauss | |
|---|---|---|---|---|
| | | | Br | $4\pi I_m$ |
| No. of treatment: | | | | |
| 1 | 0.5 | 535 | 2,320 | 4,100 |
| 2 | 1.0 | 480 | 2,420 | 3,800 |
| 3 | 3.0 | 440 | 2,000 | 3,800 |
| 4 | 5.0 | 480 | 1,700 | 3,150 |
| 5 | 10.0 | 460 | 1,500 | 3,000 |

EXAMPLE 5

A starting mixture, which consists of 20 grams of chromium trioxide, 0.163 gram of telluric acid and 0.227 gram of lead monoxide, is admixed with water and various amounts of ammonia water (28% solution). Water is 10% by weight relative to chromium trioxide. The amount of ammonia water (28% solution) ranges from 1% to 50% by weight relative to chromium trioxide.

The resultant mixtures are heated, cooled and washed in a manner the same as that of Example 3.

The resultant ferromagnetic chromium dioxides have superior magnetic properties as listed in Table II.

TABLE II.—MAGNETIC PROPERTIES OF FERROMAGNETIC CHROMIUM OXIDE REACTED WITH VARIOUS AMOUNTS OF AMMONIUM

| | Ammonia water (28% sol.) weight per-cent relative to $CrO_3$ | Hc(oersteds) | Gauss | |
|---|---|---|---|---|
| | | | Br | $4\pi I_m$ |
| No. of treatment: | | | | |
| 1 | 5.0 | 500 | 2,050 | 4,050 |
| 2 | 10.0 | 520 | 2,300 | 4,100 |
| 3 | 20.0 | 545 | 2,400 | 4,020 |
| 4 | 30.0 | 540 | 2,300 | 4,050 |
| 5 | 50.0 | 500 | 1,700 | 3,100 |

What is claimed is:

1. A ferromagnetic chromium dioxide having a combination of lead and tellurium incorporated therewith, said combination being in an amount of not more than 30 atomic percent in total and consisting of 0.01 to 10 atomic percent of lead and 0.01 to 20 atomic percent of tellurium, said atomic percent being based on the sum of the chromium, lead and tellurium atoms.

2. A ferromagnetic chromium dioxide according to claim 1, wherein said combination is in an amount of not more than 11 atomic percent in total and consists of 0.01 to 1.0 atomic percent of lead and 0.01 to 10 atomic percent of tellurium.

3. A ferromagnetic chromium dioxide according to claim 1, wherein said combination is in an amount of not more than 3.5 atomic percent in total and consists of 0.01 to 0.5 atomic percent of lead and 0.01 to 3 atomic percent of tellurium.

4. A ferromagnetic chromium dioxide according to claim 3, wherein said ferromagnetic chromium dioxide consists essentially of finely divided acicular particles of 0.1 to 2.0 microns in length and 0.01 to 0.4 micron in width and is in a single phase of rutile type of crystalline structure.

5. A ferromagnetic chromium dioxide according to claim 1 wherein said combination is in an atomic ratio of tellurium to lead ranging from 10:1 to 2.0:1.0.

6. A method for making a ferromagnetic chromium dioxide material comprising providing a mixture of chromium trioxide, a tellurium compound selected from the group consisting of $TeO_2$, $TeO_3$, $TeCl_4$, $H_2TeO_4$, $H_6TeO_6$, $Na_2TeO_4$ and $K_2TeO_4$ and a lead compound selected from the group consisting of PbO, $Pb_2O_3$, $PbO_2$, $Pb_3O_4$, $PbSO_4$, PbS, $Pb(NO_3)_2$, $PbCrO_4$, $PbCl_2$, $PbCO_3$, $PbF_2$, $PbI_2$, $Pb(VO_3)_2$, $PbWO_4$, $PbC_2O_4$, $Pb_3(PO_4)_2$, $Pb(HCOO)_2$ and $PbSnO_3$ in an atomic percent of

| | |
|---|---|
| Cr | 99.98 to 70 |
| Te | 0.01 to 20 |
| Pb | 0.01 to 10 |

heating said mixture in the presence of an aqueous solution containing $NH_4^+$ ions from a source selected from the group consisting of $NH_4Cl$, $NH_4F$, $NH_4Br$, $(NH_4)_2SO_4$, $NH_4NO_3$, $HCOONH_4$, $(NH_4)_2C_2O_4$, $NH_4I$ and $CH_3COONH_4$ at a temperature of 280° C. to 480° C. under presure of 50 to 1000 atmospheres, wherein said aqueous solution contains $NH_4^+$ ions in an amount sufficient to produce a weight ratio of $$CrO_3:NH_4^+=1:0.001 \text{ to } 1.0:0.15$$

7. A method for making a ferromagnetic chromium dioxide material according to claim 6 wherein said tellurium compound consists of at least one member selected from the group consisting of $H_2TeO_4$, $H_6TeO_6$ and $TeO_3$.

8. A method for making a ferromagnetic chromium dioxide material according to claim 6 wherein said lead compound consists of at least one member selected from the group consisting of $Pb_2O_3$ and $PbO_2$.

References Cited

UNITED STATES PATENTS 3,243,260 3/1966 Kubota et al. ________ 23—145
3,371,043 2/1968 Hund et al. _______ 252—62.51

TOBIAS E. LEVOW, Primary Examiner

J. COOPER, Assistant Examiner

U.S. Cl. X.R.

23—145